Dec. 23, 1958 M. T. POPOVICH ET AL 2,865,980
BUS DUCT
Filed May 25, 1954

INVENTORS
Arthur C. Roethlisberger &
Montgomery T. Popovich.
BY
ATTORNEY

United States Patent Office 2,865,980
Patented Dec. 23, 1958

2,865,980

BUS DUCT

Montgomery T. Popovich, Beaver Falls, and Arthur C. Roethlisberger, Beaver, Pa., assignors to Westinghouse Electric Corporation, East Pittsburgh, Pa., a corporation of Pennsylvania Application May 25, 1954, Serial No. 432,174

2 Claims. (Cl. 174—75)

Our invention relates generally to bus duct for electrical distribution systems and more particularly to cable tap boxes for bus duct.

Cable tap boxes are utilized where power is supplied to a run of bus duct through cables or where equipment served by the duct is connected directly to the duct through cables without overcurrent protection. Heretofore, the supports and the connections for the bus bars have been somewhat complicated in structure, thereby causing the box or housing for the supporting and connecting members to be unduly large.

An object of our invention, generally stated, is to provide a cable tap box for bus duct which shall be simple and efficient in operation and which may be economically manufactured and installed.

A more specific object of our invention is to provide for connecting the ends of a plurality of power cables directly to each bus bar in a cable tap box for bus duct, without the current flowing through any bolted or brazed joints in the cable tap box.

Another object of our invention is to provide supporting members for the bus bars in a cable tap box which may be utilized with bus bars of different ratings.

A further object of our invention is to maintain in a simple manner proper insulation and spacing between the ends of the bus bars in a cable tap box.

Still another object of our invention is to prevent rotation or slipping of the bus bars in a cable tap box.

A still further object of our invention is to provide for removably attaching a plurality of solderless connectors to each bus bar in a bus duct.

Other objects of our invention will be explained fully hereinafter or will be apparent to those skilled in the art.

In accordance with one embodiment of our invention, the end of each bus bar in a bus duct section is notched to provide a plurality of fingers thereon. A cable is connected directly to each finger by means of a solderless connector having a collar disposed on the finger. The ends of the bus bars and the connectors are enclosed by a tap box having a removable cover. This tap box may be at the end of a run of bus duct or may be of the type mounted on the front or rear side of the duct at one of the joints at a mid-portion of the run of bus duct. The bus bars in one embodiment may be clamped edgewise between two notched supports having their ends bolted to angles attached to the box. The bus bars may be clamped flatwise between blocks having notches therein for the bars, with the blocks drawn together by bolts extending through the blocks.

For a better understanding of the nature and objects of the invention, reference may be had to the following detailed description, taken in conjunction with the accompanying drawing, in which.

Figure 1:
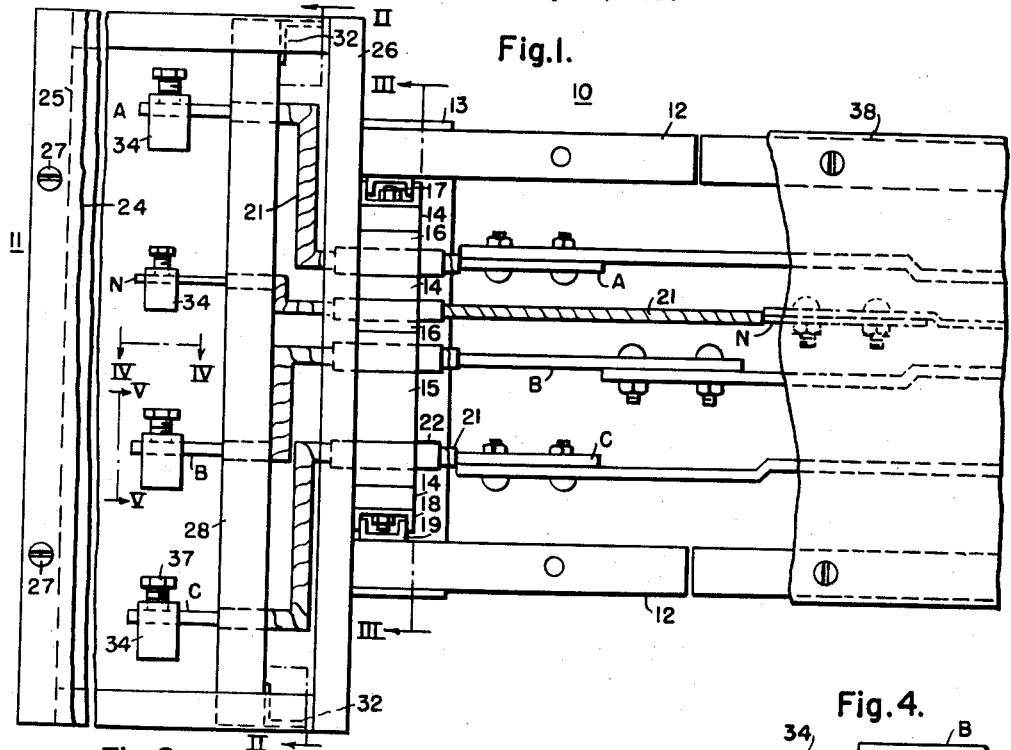
Figure 1 is a view, in side elevation, of a cable tap box and bus duct embodying the principal features of the invention.
Figure 3:
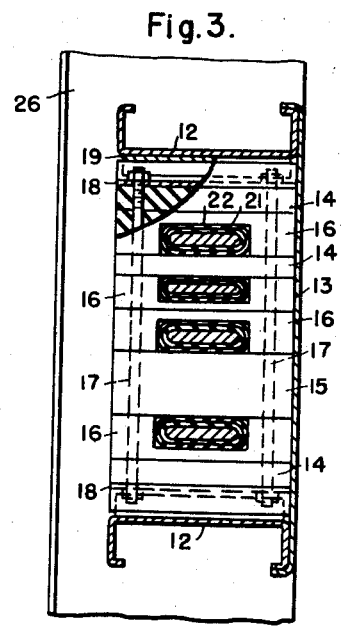
Fig. 3 is a view, in section, taken along the line III—III in Fig. 1.

Referring to the drawing, and particularly to Fig. 1, the structure shown therein comprises a short section of bus duct 10 having a cable tap box 11 secured to the end of the duct. As shown most clearly in Fig. 3, the housing for the duct 10 comprises top and bottom channel members 12 having front and rear side covers 13 attached thereto. In the present drawing the front cover 13 has been removed.

Bus bars A, B and C and a neutral bar N are mounted inside the duct housing. The bus bars are supported by a plurality of spacers 14 and 15 and blocks 16 which are notched to receive the bus bars. The spacers and blocks are preferably composed of hard wood and are disposed in contiguous relation to engage the sides of the bus bars. The blocks and spacers are drawn together by bolts 17 which extend through holes provided in the blocks and spacers. The bolts 17 also extend through channel members 18 disposed at the top and the bottom of the block assembly. Channel members 19 are disposed inside the channel members 18 and are secured to the channels 12 of the housing, thereby determining the position of the supporting assembly in the housing.

As shown, a portion of each bus bar is wrapped with an insulating tape 21. An insulating sleeve 22 surrounds the tape 21 underneath the supporting blocks, thereby providing additional protection for the tape 21 where the bus bars are engaged by the blocks. The insulating tape 21 and the insulating sleeves 22 extend beyond the edges of the blocks to provide a greater electrical creepage distance over surfaces between adjacent bus bars than is provided over the surfaces of the blocks alone.

As indicated in Fig. 1, the duct section 10 may be connected to another section of bus duct in the usual manner. The bus bars are connected to the corresponding phase bus bars in the adjoining section by overlapping joints as shown. The channel members 12 may be connected to adjoining channel members by means of splice plates (not shown) and access covers 38 may be provided for closing the gap between the side covers of the two adjoining duct housing sections.

Figure 2:
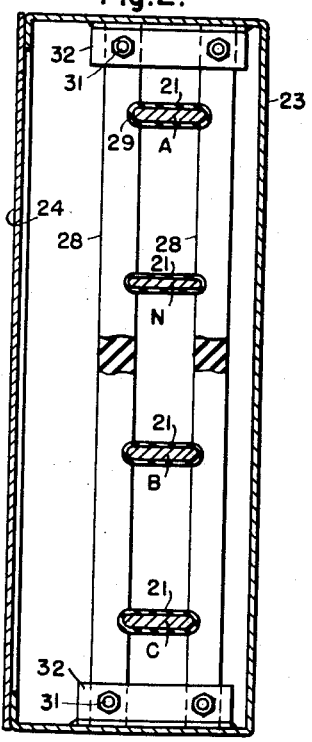
Fig. 2 is a view, in section, taken along the line II—II in Fig. 1.

As shown most clearly in Figs. 1 and 2, the cable tap box 11 comprises a sheet metal side band or wrapper 23, a removable cover 24, and end members 25 and 26. The cover 24 is attached to the end members by means of screws 27. As previously explained, the end member 26 is secured to the channel members 12 of the duct housing 10, preferably by welding. The end member 26 has an opening therein through which the bus bars A, B, C and N extend.

As shown most clearly in Fig. 1, the ends of the bus bars which terminate in the box 11 are flared or offset outwardly to provide additional clearance between the ends of the bars and to provide more space between the terminal connectors thereon. As shown most clearly in Fig. 2, the flared relation of the bus bars is maintained by two insulating bars 28 which engage the edges of the bus bars. The insulating bars 28 have notches 29 in their inner or facing sides for receiving the edges of the bus bars. This eliminates the use of any metal supporting members at the potential of the bus bars, which would increase the size of the assembly because they would have to be spaced apart a sufficient distance to give the required electrical clearances between the brackets.

The insulating bars 28 are retained in position by bolts 31 which extend through the bars into angle members 32. The angle members 32 are secured to the side band 23 of the housing, preferably by welding.

Thus, the proper spacing between the ends of the bus bars is maintained, but is kept to a minimum. Slipping or longitudinal movement of the bus bars is prevented by the clamping action of the block assembly previously described. Any tendency of the bus bars to rotate about the point of support is also prevented by the block assembly. Therefore the bus bars are securely held in position.

The insulating tape 21 which is wrapped around the bus bars adjacent the supporting blocks 13, 14, 15 and 16, also extends around the offsets of the bus bars in the box portion 11 and under the insulating bars 28. For three-conductor bus duct where the neutral bar N is not used, the center bus bar B need not be offset; and since there is greater electrical clearance between the bus bars, the extension of the insulating tape 21 between the insulating supports need be provided only on the center bus bar B.

In order to provide for connecting cables 33 (see Fig. 5) directly to the bus bars, solderless connectors 34 are mounted on the ends of the bus bars. As shown most clearly in Figs. 4 and 5, the end of each bus bar is notched to provide a plurality of fingers 35 on each bus bar. A solderless connector 34 in the form of a tubular sleeve is provided on each finger 35. The connectors 34 are prevented from slipping off the ends of the fingers by spreading the end of each finger, as shown at 36, by a simple swaging operation. A connector may be removed by rotating it sidewise to clear the widened end of the finger.

Figure 4:
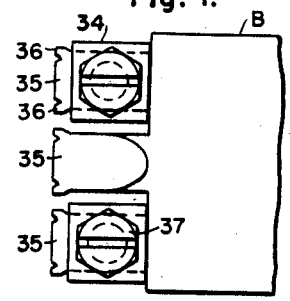
Fig. 4 is a view, in plan, looking in the direction indicated by the line IV—IV in Fig. 1.
Figure 5:
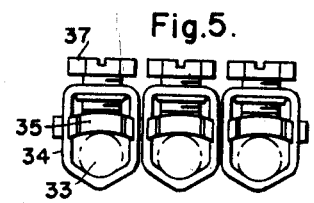
Fig. 5 is a view, in end elevation, looking in the direction indicated by the line V—V in Fig. 1.

As shown in Figs. 4 and 5, each finger may be curved slightly by a pressing operation to receive a cable 33. The cable 33 is clamped between the finger 35 and the collar 34 by tightening a screw 37 which is threaded into the collar 34.

In this manner a plurality of cables may be connected directly to each bus bar by having the ends of the cables pressed directly against the bus bar, without the use of any bolted or brazed joint between the end of the cable and the bus bar. It will be understood that the number of connectors provided on each bus bar may be varied as required to conduct the rated current. In general, the width of the bus bar varies with the current rating of the bus bar. Likewise, the number of fingers and connectors provided will vary with the current rating. It will also be understood that the connectors 34 may be of a type which will permit more than one cable to be attached by each connector. In this manner, provision may be made for conducting higher currents when required.

The cables 33 may enter the tap box 11 through knockouts or openings provided in the end member 25. As previously explained, the cover 24 is removable, thereby permitting access to the tap box to connect the cables to the bus bars by means of the connectors 34 in the manner previously explained.

From the foregoing description, it is apparent that we have provided for connecting power cables to the bus bars in a bus duct structure in a simple and efficient manner. Since the cables are connected directly to the ends of the bus bars, power losses are reduced by reduction of the resistance drop through the cable connections. Prior methods of connecting cables to bus bars required bolted connections which increased the resistance drop. Furthermore, the ends of the bus bars had to be silver plated at the bolted connections to prevent oxidation of the copper.

Also, since the bolted connections are eliminated, the size of the cable tap box is reduced. The present manner of supporting the ends of the bus bars in the cable tap box requires a fewer number of supporting members than was required by previous supporting methods. Prior methods also required the stocking of a relatively large number of brackets and supporting members of different sizes, depending on the current ratings of the bus bars. The present method requires a relatively small number of parts since the same supporting bars 28 may be utilized with bus bars of different ratings, it being merely necessary to space them apart a greater distance to receive wider bus bars. Therefore, we have simplified and improved the manner of connecting power cables to bus bars which are enclosed in a duct housing.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a cable tap box for a run of bus duct comprising a duct housing having duct bus bars therein, in combination, a metal enclosure for attaching to the duct housing, a plurality of generally flat bus bars having an end of each bar disposed in said enclosure with the other ends of the bus bars extending outwardly from the enclosure for connecting to the duct bus bars, a plurality of insulating blocks engaging the sides of the flat bus bars outside the enclosure, tie bolts extending through the blocks for clamping them against the flat bus bars to prevent longitudinal movement of the bars, at least some of the flat bus bars being bent sidewise to space the ends of the bars inside the enclosure farther apart than the ends outside the enclosure, oppositely disposed notched insulating members engaging the edges of the flat bus bars inside the enclosure to retain the ends of the bars in widely spaced relation inside the enclosure, ends of the flat bus bars in the enclosure having notches therein extending longitudinally of the bars to provide a plurality of fingers thereon, a solderless connector on each finger, each connector having a portion for engaging a cable to press it directly against the bus bar, and the distance maintained between the ends of the bars in the enclosure by said notched insulating members being sufficient to permit said connectors to be uninsulated.

2. In a bus duct, in combination, a duct housing containing a plurality of generally flat bus bars, an enclosure attached to one end of the duct housing, said bus bars terminating in the enclosure, the cross-sectional area of the enclosure being greater than the cross-sectional area of the duct housing, at least some of the bus bars being bent sidewise to space the ends of the bars inside the enclosure farther apart than the ends outside the enclosure, notched insulating members engaging opposite edges of the bus bars inside the enclosure to retain the ends of the bars in said widely spaced relation, bracket means secured to opposite ends of the enclosure, the ends of said insulating members being attached to said bracket means, a plurality of insulating blocks engaging the sides of the bus bars outside the enclosure, tie bolts extending through the blocks for clamping them against the bars to prevent longitudinal movement of the bars, retaining means in the duct housing for determining the position of the blocks in the housing, ends of the bus bars in the enclosure having notches therein extending longitudinally of the bars to provide a plurality of fingers thereon, a solderless connector on each finger, each connector having a portion for engaging a cable to press it directly against the bus bar, insulation covering portions of the bus bars inside the enclosure, and the distance maintained between the ends of the bars in the enclosure by said notched insulating members being sufficient to permit said connectors to be uninsulated.

References Cited in the file of this patent

UNITED STATES PATENTS

| | | |
|---|---|---|
| 1,999,137 | Flewelling | Apr. 23, 1935 |
| 2,430,557 | Carlson | Nov. 11, 1947 |
| 2,483,551 | Libman | Oct. 4, 1949 |
| 2,574,781 | Greene | Nov. 13, 1951 |
| 2,576,774 | Carlson | Nov. 27, 1951 |
| 2,653,991 | Dyer et al. | Sept. 29, 1953 |
| 2,656,201 | Swerdlow | Oct. 20, 1953 |
| 2,713,672 | Allen | July 19, 1955 |
| 2,733,289 | Warren et al. | Jan. 31, 1956 |